(12) United States Patent
Sugiyama et al.

(10) Patent No.: US 9,303,698 B2
(45) Date of Patent: Apr. 5, 2016

(54) VEHICULAR ELECTRIC DRIVE APPARATUS

(75) Inventors: Masataka Sugiyama, Toyota (JP);
Hiroaki Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/360,367

(22) PCT Filed: Nov. 26, 2011

(86) PCT No.: PCT/JP2011/077264
§ 371 (c)(1),
(2), (4) Date: May 23, 2014

(87) PCT Pub. No.: WO2013/076878
PCT Pub. Date: May 30, 2013

(65) Prior Publication Data
US 2014/0262675 A1    Sep. 18, 2014

(51) Int. Cl.
*F16D 25/10* (2006.01)
*B60K 6/52* (2007.10)
*F16H 57/04* (2010.01)
*B60K 1/00* (2006.01)

(52) U.S. Cl.
CPC ............ *F16D 25/10* (2013.01); *F16H 57/0445* (2013.01); *F16H 57/0457* (2013.01); *F16H 57/0473* (2013.01); *F16H 57/0476* (2013.01); *F16H 57/0483* (2013.01); *B60K 2001/001* (2013.01)

(58) Field of Classification Search
CPC . F16D 25/10; F16H 57/0445; F16H 57/0476; F16H 57/0457; F16H 57/0483
See application file for complete search history.

(56) References Cited

U.S. PATENT DOCUMENTS 6,155,364 A     12/2000  Nagano et al.
6,401,894 B1 *   6/2002  Merkel et al. ................ 192/48.9
2007/0125191 A1 * 6/2007  Stenvall ......................... 74/330
(Continued)

FOREIGN PATENT DOCUMENTS

CN    101922531 A    12/2010
JP    09-226392       9/1997
(Continued)

OTHER PUBLICATIONS

International Search Report issued Feb. 21, 2012, in PCT/JP11/077264, filed Nov. 26, 2011.

*Primary Examiner* — Colby M Hansen
(74) *Attorney, Agent, or Firm* — Oblon, McClelland, Maier & Neustadt, L.L.P.

(57) ABSTRACT

A vehicular electric drive system includes: an electric motor operatively connected to drive wheels; a hydraulically operated clutch disposed in a power transmitting path between the electric motor and the drive wheels; a gear mechanism disposed between the hydraulically operated clutch and the drive wheels; a first chamber accommodating the electric motor and the hydraulically operated clutch; a second chamber accommodating the gear mechanism; a partition wall disposed so as to isolate the first chamber and the second chamber from each other; a connecting hole formed on the partition wall; an oil seal fitted in the connecting hole; an oil pump provided to deliver the oil required within the first chamber; and a splash type lubricating mechanism provided to supply the oil to the second chamber.

3 Claims, 2 Drawing Sheets

(56) References Cited

U.S. PATENT DOCUMENTS

2010/0314185 A1* 12/2010 Schoenek .................... 180/65.7
2012/0061201 A1* 3/2012 Isogai et al. ............... 192/85.01
2012/0217114 A1* 8/2012 Ari et al. ..................... 192/48.1

FOREIGN PATENT DOCUMENTS

| JP | 2002-087080 | 3/2002 |
| JP | 2005-263208 | 9/2005 |

* cited by examiner

VEHICULAR ELECTRIC DRIVE APPARATUS

TECHNICAL FIELD

The present invention relates to an arrangement of a vehicular electric drive apparatus.

BACKGROUND ART

There is well known a vehicular electric drive apparatus wherein an electric motor is operatively connected to drive wheels so that the drive wheels are driven by the electric motor. Patent Document 1 discloses an example of such a vehicular electric drive apparatus in the form of an auxiliary drive device 20 of a main drive device 10. The auxiliary drive device 20 of Patent Document 1 is provided with major components including an electric motor 20a, a speed reducing gear train 20b (gear mechanism) for reducing the operating speed of the electric motor 20a, and a differential device 20d. The electric motor 20a is used to drive rear wheels 21b (drive wheels). The electric motor 20a is isolated from the speed reducing gear train 20b by an axle casing 24.

PRIOR ART DOCUMENT

Patent Document

Patent Document 1: JP-2005-263208 A

SUMMARY OF THE INVENTION

Object Achieved by the Invention

By the way, an electric motor provided in a vehicular electric drive apparatus such as the auxiliary drive device 20 disclosed in Patent Document 1 by way of example is usually cooled by an oil, to ensure a high degree of thermal performance of the electric motor. Where the electric motor is accommodated in a space also accommodating the gear mechanism, for simply cooling of the electric motor with the oil, different amounts of the oil are required for respectively cooling the electric motor and the gear mechanism, so that if an oil supply device is designed on the basis of the amount of the oil required for the electric motor or the gear mechanism, this amount is larger than required or insufficient for the other of the electric motor and the gear mechanism. Where the vehicular electric drive apparatus is provided with a transmission mechanism having hydraulically operated clutches, different amounts of the oil are required for respectively cooling the electric motor, the gear mechanism and the transmission mechanism, giving rise to a problem of difficult supply of the optimum amounts of the oil to the respective parts of the vehicular electric drive apparatus.

The present invention was made in view of the background art described above. It is therefore an object of this invention to provide a vehicular electric drive system in which an electric motor is operatively connected to drive wheels so that the drive wheels are driven by the electric motor, and which permits only a required amount of supply of an oil.

Means for Achieving the Object

The object indicated above is achieved according to a first aspect of the present invention, which provides a vehicular electric drive system wherein (a) an electric motor is operatively connected to drive wheels so that the drive wheels are driven by the electric motor, characterized by comprising (b) a hydraulically operated clutch configured to place a power transmitting path between the above-described electric motor and the above-described drive wheels in a selected one of a power transmitting state and a power cutoff state, (c) a gear mechanism disposed between the above-described hydraulically operated clutch and the above-described drive wheels, to reduce a speed of a rotary motion of the above-described electric motor, (d) a first chamber accommodating the above-described electric motor and the above-described hydraulically operated clutch, (e) a second chamber accommodating the above-described gear mechanism, (f) a partition wall disposed so as to isolate the above-described first chamber and the above-described second chamber from each other, (g) a connecting hole formed on said partition wall through which the above-described hydraulically operated clutch and the above-described gear mechanism are operatively connected to each other, (h) an oil seal fitted in the connecting hole, to restrict flows of an oil through the connecting hole, and (i) an oil pump provided to deliver the oil required within the above-described first chamber.

Advantages of the Invention

The vehicular electric drive system described above is configured such that the oil delivered from the oil pump is supplied to the hydraulically operated clutch and the electric motor accommodated in the first chamber. Accordingly, it is possible to prevent a shortage of supply of the oil to the hydraulically operated clutch and the electric motor. On the other hand, the gear mechanism accommodated in the second chamber and lubricated by the oil does not require a large amount of the oil, and is therefore lubricated by another independent oil supply mechanism of a splash type, for example. Thus, the first chamber is supplied with the pressurized oil delivered from the oil pump, while the second chamber is supplied with the oil by the oil supply mechanism not using the oil pump, whereby only the required amounts of the oil are supplied to the first and second chambers, so that the fuel economy can be improved.

According to a second aspect of this invention, the vehicular electric drive system according to the first aspect of the invention is configured such that the above-described gear mechanism is a transmission having two speed positions, and the above-described hydraulically operated clutch is a dual clutch consisting of two frictional coupling devices, and such that the above-described transmission is shifted between the two speed positions, by switching operating states of the two frictional coupling devices. According to this second aspect of the invention, the transmission can be shifted by simply controlling the frictional coupling devices, without using shift forks and sleeves for the shifting actions, so that the vehicular electric drive system can be made simple in construction.

According to a third aspect of the invention, the vehicular electric drive system according to the second aspect of the invention is configured such that the above-described oil pump is driven by the above-described electric motor, and one of the above-described frictional coupling devices which is placed in an engaged state upon starting of a vehicle is a frictional coupling device of a normally-engaged type which is placed in the engaged state when a hydraulic pressure is not applied thereto. According to this third form of the invention, the vehicle can be rapidly started without the hydraulic pressure application to the frictional coupling device to be placed in the engaged state to start the vehicle although the electric motor and the oil pump are not driven upon starting of the vehicle, thus the hydraulic pressure application to the above-indicated frictional coupling device would be delayed.

MODE FOR CARRYING OUT THE INVENTION

Embodiments of this invention will be described in detail by reference to the drawings. It is to be understood that the drawings are simplified and deformed as needed, and do not necessarily accurately represent the dimensions and shapes of components of the embodiments.

First Embodiment

Figure 1:
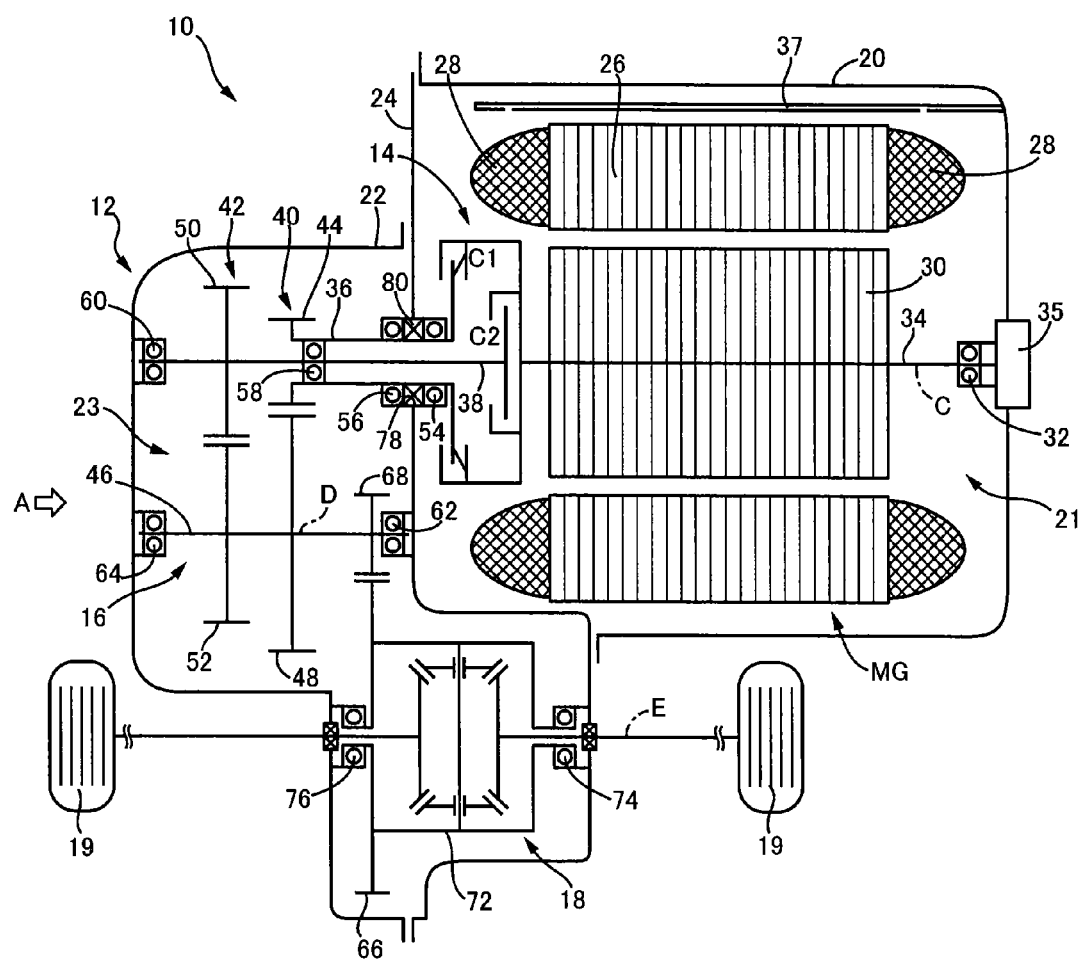
FIG. 1 is a cross sectional view of a vehicular electric drive system according to a preferred embodiment of this invention.

FIG. 1 is the cross sectional view of a vehicular electric drive system 10 (hereinafter referred as an "electric drive system 10") according to one embodiment of this invention. The electric drive system 10 is provided with major components including an electric motor MG, a dual clutch 14, a speed reducing gear mechanism 16 and a differential device 18, which are accommodated within an axle casing 12. In the electric drive system 10, the electric motor MG is operatively connected to drive wheels 19 through the dual clutch 14, speed reducing gear mechanism 16 and differential device 18, so that the drive wheels 19 are driven by the electric motor MG.

The axle casing 12 consists of a first casing 20 accommodating the electric motor MG and the dual clutch 14 as the major components, a second casing 22 having a tubular shape with a closed end and accommodating the speed reducing gear mechanism 16 as the major component, and a partition wall 24 which isolates the first casing 20 and the second casing 22 from each other. These first and second casings 20, 22 and the partition wall 24 are integrally fixed to each other with bolts not shown. The first casing 20 defines a first chamber 21 accommodating the electric motor MG and the dual clutch 14 as the major components, while the second casing 22 defines a second chamber 23 accommodating the speed reducing gear mechanism 16 as the major component.

The electric motor MG includes major elements consisting of: a stator 26 fixed to the first casing 20 by bolts not shown, such that the stator 26 is not rotatable; coil ends 28 disposed at respective axially opposite ends of the stator 26; a rotor 30 disposed radially inwardly of the stator 26; and a rotor shaft 34 fixedly extending through the rotor 30 and supported by a bearing 32 at one axial end thereof such that the rotor shaft 34 is rotatable about an axis C.

The end portion of the rotor shaft 34 on the side of the bearing 32 is provided with an oil pump 35, which is a gear pump well known in the art and which is driven by a rotary motion of the electric motor MG (rotor shaft 34). The oil pump 35 sucks up an oil accommodated in a lower portion of the first chamber 21, that is, in a lower portion of the first casing 20, and delivers the oil. The oil thus pressurized by the oil pump 35 is used to control (engage) the dual clutch 14 through a pressure control valve body 82 (shown in FIG. 2), and also used as a coolant for the electric motor MG.

The dual clutch 14 is disposed radially inwardly of the stator 26 of the electric motor MG, to place a power transmitting path between the electric motor MG and the drive wheels 19, in a selected one of a power transmitting state and a power cutoff state. The dual clutch 14 is provided with two hydraulically operated clutches in the form of a first clutch C1 and a second clutch C2. The dual clutch 14 is configured such that the first clutch C1 and the second clutch C2 partially overlap each other in the radial direction, and the axial dimension of the dual clutch 14 is reduced. The first clutch C1 selectively connects and disconnects the rotor shaft 34 of the electric motor MG to and from a first input shaft 36 of the speed reducing gear mechanism 16 described below, while the second clutch C2 selectively connects and disconnects the rotor shaft 34 of the electric motor MG to and from a second input shaft 38 of the speed reducing gear mechanism 16 described below.

In the present embodiment, the first clutch C1 is a frictional coupling device of a normally-engaged type which is placed in its engaged state when a hydraulic pressure of the oil is not applied thereto, while the second clutch C2 is a frictional coupling device of a normally-released type which is placed in its engaged state when a hydraulic pressure of the oil is applied thereto. These first and second clutches C1 and C2 are basically identical in specific construction with a conventional hydraulically operated clutch, and the construction will not be described. It is to be understood that the dual clutch 14 corresponds to a hydraulically operated clutch provided according to the present invention, while the first and second clutches C1 and C2 correspond to two frictional coupling devices provided according to the invention.

The hydraulic pressure of the oil delivered from the oil pump 35 is regulated by the valve body 82 (shown in FIG. 2), so that the regulated hydraulic pressure is supplied to the dual clutch 14. Similarly, the hydraulic pressure of the oil used as the coolant to be supplied to the electric motor MG is generated by the oil pump 35, and sucked up through the valve body 82 (shown in FIG. 2) into a coolant passage 37 located above the electric motor MG, so that the coolant is ejected from the coolant passage 37 toward the coil ends 28 of the electric motor MG. The dual clutch 14 accommodated in the first chamber 21 requires a relatively large amount of oil, which is provided by the oil pump 35. It is also noted that the dual clutch 14 is disposed radially inwardly of the coil ends 28 of the electric motor MG, so that a space which is provided radially inwardly of the coil ends 28 (and which is a dead space in the prior art) can be effectively utilized, whereby the required axial length of the electric drive system 10 can be reduced.

The speed reducing gear mechanism 16 (gear mechanism) is disposed between the dual clutch 14 and the drive wheels 19, and is provided with a first speed reducing gear pair 40 and a second speed reducing gear pair 42. The first speed reducing gear pair 40 consists of a first small-diameter gear 44 fixed to the first input shaft 36 which is connected to the first clutch C1 and rotatable about the axis C, and a first large-diameter gear 48 fixed to a counter shaft 46 parallel to the axis C and meshing with the first small-diameter gear 44. The second speed reducing gear pair 42 consists of a second small-diameter gear 50 fixed to the second input shaft 38 which is connected to the second clutch C2 and rotatable about the axis C, and a second large-diameter gear 52 fixed to the counter shaft 46 and meshing with the second small-diameter gear 50. Each of The first and second speed reducing gear pairs 40 and 42 is a meshing-type gear mechanism configured to reduce the speed of the rotary motion of the electric motor MG.

The first small-diameter gear 44 has a pitch circle diameter (effective diameter) determined to be smaller than that of the second small-diameter gear 50, while the first large-diameter gear 48 has a pitch circle diameter determined to be larger than that of the second large-diameter gear 52, so that the first speed reducing gear pair 40 has a speed ratio γ1 larger than a speed ratio γ2 of the second speed reducing gear pair 42. When the first clutch C1 is placed in the engaged state, a drive force of the electric motor MG is transmitted to the drive wheels 19 through the first speed reducing gear pair 40, so that the speed reducing gear mechanism 16 is placed in a first speed position having the speed ratio γ1. When the second clutch C2 is placed in the engaged state, the drive force of the electric motor MG is transmitted to the drive wheels 19 through the second speed reducing gear pair 42, so that the speed gear mechanism 16 is placed in a second speed position having the speed ratio γ2. Namely, the speed reducing gear mechanism 16 functions as a transmission (speed reducing device) having two speed positions which are selectively established by respective different combinations of the operating states of the first clutch C1 and second clutch C2.

The first input shaft 36 of the speed reducing gear mechanism 16 is supported by the axle casing 12 via bearings 54 and 56 fixed to the partition wall 24, such that the first input shaft 36 is rotatable about the axis C. The second input shaft 38 of the speed reducing gear mechanism 16 extends through the interior of the first input shaft 36, in line with the axis C, and is supported by the axle casing 12 via bearings 58 and 60, such that the second input shaft 38 is rotatable about the axis C. Thus, the first input shaft 36 and the second input shaft 38 are disposed radially outwardly and inwardly of each other, and coaxially with each other in line with the axis C. The counter shaft 46 is supported by the axle casing 12 via bearings 62 and 64 such that the counter shaft 46 is rotatable about an axis D parallel to the axis C. To an end portion of the counter shaft 46 on the side of the electric motor MG, there is fixed a drive gear 68 which meshes with a driven gear 66 of the differential device 18. In the present embodiment, the bearing 58 is a sealed ball bearing which has a function of an oil seal. Accordingly, the bearing 58 restricts axial flows of the oil therethrough.

The differential device 18 is a final speed reducing device configured to reduce the speed of a rotary motion of the drive gear 68, and to transmit the rotary motion to the pair of left and right drive wheels 19, while permitting a suitable amount of difference between the rotating speeds of the drive wheels 19. The driven gear 66 is formed integrally with a differential casing 72 of the differential device 18. This differential casing 72 is supported by the axle casing 12 via bearings 74 and 76 such that the differential casing 72 is rotatable about an axis E. It is noted that the construction and operation of the differential device 18 are known in the art, and will not be described herein. Since the driven gear 66 is located at a position corresponding to an axial end portion of the counter shaft 46 on the side of the electric motor MG, the differential device 18 is axially positioned so as to overlap with the electric motor MG and the dual clutch 14 in the axial direction, so that the overall axial length of the electric drive system 10 is reduced.

As described above, the first casing 20 defines the first chamber 21 accommodating the electric motor MG and the dual clutch 14 as the major components, while the second casing 22 defines the second chamber 23 accommodating the speed reducing gear mechanism 16 as the major component. The first chamber 21 and the second chamber 23 are formed on the respective opposite sides of the partition wall 24, and are isolated from each other by the partition wall 24.

The partition wall 24 has a connecting hole 78 through which the first input shaft 36 and the second input shaft 38 of the speed reducing gear mechanism 16 extend into the first chamber 21, for operatively connecting the first input shaft 36 to the first clutch C1, and for operatively connecting the second input shaft 38 to the second clutch C2. This connecting hole 78 is a round hole. The first input shaft 36 and the second input shaft 38 extend into the first chamber 21 through the partition wall 24, with the first input shaft 36 passing through the connecting hole 78 while the second input shaft 38 passing through the interior of the first input shaft 36. The first input shaft 36 and the second input shaft 38 are respectively connected to the first clutch C1 and the second clutch C2, at their ends located within the first chamber 21.

An annular oil seal 80 is fitted in the connecting hole 78 such that the oil seal 80 is held in sliding contact with the outer circumferential surface of the first input shaft 36. This oil seal 80 restricts flows of the oil through the connecting hole 78.

Figure 2:
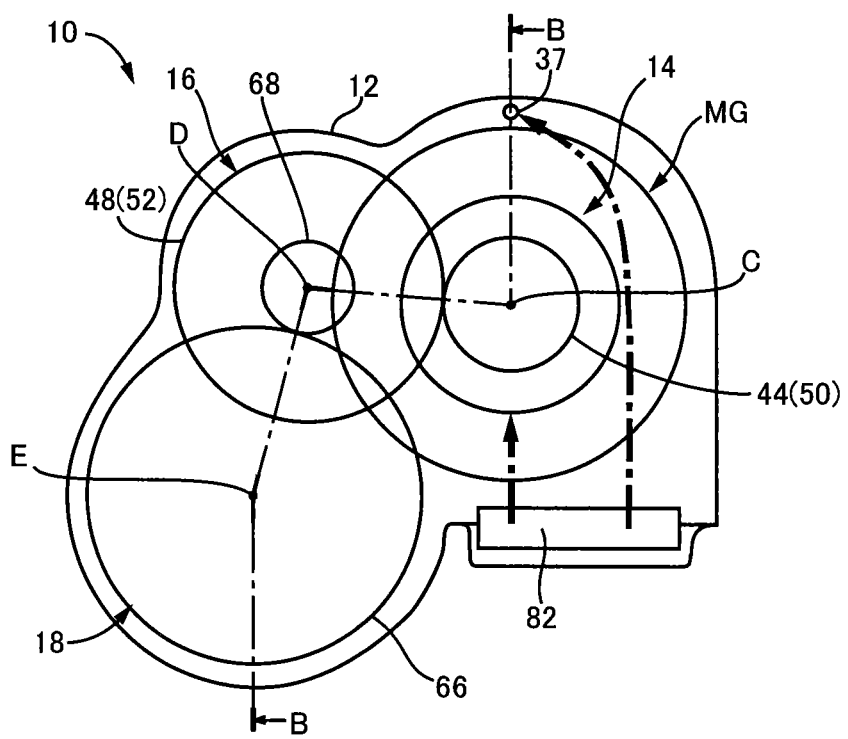
FIG. 2 is a side view taken in a direction of an arrow A in FIG. 1.

FIG. 2 is the side view taken in a direction of an arrow A in FIG. 1, schematically showing positions of axes of the electric motor MG, speed reducing gear mechanism 16 and differential device 18. The upward direction as seen in FIG. 2 corresponds to the vertically upward direction of the vehicle, while the rightward direction as seen in FIG. 2 corresponds to the forward running direction of the vehicle. It is noted that FIG. 1 is the cross sectional view taken along line B-B in FIG. 2. As shown in FIG. 2, the axis D of the speed reducing gear mechanism 16 is located at the highest position, while the axis E of the differential device 18 is located at the lowest position. The valve body 82 making up a hydraulic control unit is disposed below the electric motor MG and the dual clutch 14. This valve body 82 regulates the hydraulic pressures of the oil delivered from the oil pump 35, and the oil of the regulated hydraulic pressure is fed to the coolant passage 37 for the electric motor MG, and the regulated hydraulic pressures are applied to the dual clutch 14, as indicated by one-dot chain lines. In this respect, it is noted that the oil is fed from the valve body 82 to the coolant passage 37, through an oil passage (not shown) formed through the axle casing 12, for example, while the oil is fed from the valve body 82 to the dual clutch 14, through an oil passage (not shown) formed through the rotor shaft 34, for example, as indicated by the one-dot chain lines. Further, a mass of the oil accommodated in a lower portion of the second casing 22 is brought or splashed up by the driven gear 66 of the differential device 18, and supplied as a lubricant to the speed reducing gear mechanism 16. The speed reducing gear mechanism 16 uses the oil as the lubricant only, and does not require a large amount of the oil since the speed reducing gear mechanism 16 has small amounts of mechanical loss and heat generation. For this reason, the oil is supplied in the splash-up manner to the speed reducing gear mechanism 16 as the lubricant. In the present embodiment, the same kind of oil is used in the first chamber 21 and the second chamber 23.

An operation of the electric drive system 10 constructed as described above will be described. During running of the vehicle with relative low speed, for instance, the first clutch C1 of the dual clutch 14 is placed in the engaged state. Described more specifically, the hydraulic pressure is applied to none of the first clutch C1 and second clutch C2. In this state, the drive force of the electric motor MG is transmitted to the left and right drive wheels 19 through the first speed reducing gear pair 40 and the differential device 18 (namely, while the electric drive system 10 is placed in the first speed position). When it is detected that the point indicative of the running state of the vehicle has moved across a predetermined shift-up line defined in a shifting map represented by an operation amount Acc of an accelerator pedal and a running speed V of the vehicle, for example, and well known in the art, the first clutch C1 is brought into its released state while the second clutch C2 is brought into its engaged state. Described more specifically, the hydraulic pressure is applied to both of the first clutch C1 and second clutch C2. As a result, the drive force of the electric motor MG is transmitted to the left and right drive wheels 19 through the second speed reducing gear pair 42 and the differential device 18 (namely, while the electric drive system 10 is placed in the second speed position). In this respect, it is noted that when it is detected that the point indicative of the vehicle running state is located close to the above-indicated shift-up line, a predetermined standby value of the hydraulic pressure is applied to the second clutch C2, so that the second clutch C2 is ready to be engaged in a short time. Accordingly, when the point indicative of the vehicle running state has moved across the shift-up line, the second clutch C2 can be rapidly placed in the engaged state, so that the shift-up action takes place with a high degree of operating response, without interruption of transmission of the drive force. Thus, the speed reducing gear mechanism 16 is shifted by switching the operating states of the first and second clutches C1 and C2.

As described above, the first clutch C1 is the coupling device of the normally-engaged type which is placed in its engaged state when the hydraulic pressure is not applied thereto, while the second clutch C2 is a frictional coupling device of the normally-released type which is placed in its engaged state when the hydraulic pressure is applied thereto. Accordingly, upon starting of the vehicle, the electric motor MG and the drive wheels 19 are operatively connected to each other through the first speed reducing gear pair 40, without a need of generating the hydraulic pressure by operating the electric motor MG, so that the vehicle can be rapidly started.

There will be described advantages of the electric drive system 10 constructed as described above. In the electric drive system 10, the first chamber 21 and the second chamber 23 are isolated from each other by the partition wall 24. In the connecting hole 78 which is formed through the partition wall 24 and through which the first input shaft 36 extends, there is fitted the oil seal 80 which restricts the flows of the oil through the connecting hole 78.

Described more specifically, the first chamber 21 accommodates the hydraulic control unit (valve body 82, etc.) for controlling the dual clutch 14, and a cooling circuit (coolant passage 37, etc.) for cooling the electric motor MG. The dual clutch 14 goes not generate a considerable amount of heat, but the dual clutch 14 requires a large amount of the pressurized oil. Further, the electric motor MG which has an electric loss generates a large amount of heat, and therefore requires a large amount of the oil as the coolant. In view of this, the oil pump 35 is provided to permit the oil to be supplied to the dual clutch 14 and the electric motor MG, without a risk of shortage of supply of the oil. On the other hand, the second chamber 23 employs a splash type lubricating mechanism wherein the oil is brought or splashed up by the driven gear 66 of the differential device 18, and supplied as the lubricant to the speed reducing gear mechanism 16. Namely, the splash type lubricating mechanism is employed to lubricate the speed reducing gear mechanism 16, because the speed reducing gear mechanism 16 has small amounts of mechanical loss and heat generation, and accordingly requires a small amount of the oil as the lubricant. Hence, the oil pump 35 is employed to supply the oil to the dual clutch 14 and the electric motor MG which are accommodated in the first chamber 21 and which require a relatively large amount of the oil. On the other hand, the splash type lubricating mechanism is employed to lubricate the speed reducing gear mechanism 16 which is accommodated in the second chamber 23 and which requires a relatively small amount of the oil. Thus, the first chamber 21 and the second chamber 23 are supplied with the required amounts of the oil, so that the electric drive system has a reduced power loss and improved fuel economy.

The oil accommodated in the second chamber 23 to lubricate the speed reducing gear mechanism 16 is comparatively likely to contain foreign matters, but the foreign matters are prevented from being transferred into the first chamber 21, in the presence of the oil seal 80 which is fitted in the connecting hole 78 formed through the partition wall 24 and which prevents the flows of the oil between the first and second chambers 21 and 23. Accordingly, the oil seal 80 reduces a risk of an operating failure (valve sticking) of the valve body 82 due to entry of the foreign matters into the valve body 82 housed in the first chamber 21.

The electric drive system 10 is further configured such that the speed reducing gear mechanism 16 functions as the transmission having the two speed positions. Shifting in this type of the speed reducing gear mechanism 16 can be executed by merely controlling the engaging states of the first clutch C1 and the second clutch C2, and does not require shift forks and sleeves for performing shifting actions. Accordingly, the electric drive system 10 is simple in construction.

The electric drive system 10 is also configured such that the electric motor MG, the dual clutch 14 and the first casing 20 constitute a single unit (module unit). Due to this modular construction of the electric motor MG and the dual clutch 14 housed in the first casing 20, different models of the electric drive system 10 having different specifications can be produced by replacing the speed reducing gear mechanism 16 with respective different models of the transmission. In addition, the productivity of the electric drive system 10 can be increased by assembling the module unit including the electric motor MG and dual clutch 14, in an exclusive production line. Further, the first input shaft 36 and the second input shaft 38 are constructed so as to be removable by spline-fitting, to make it possible to assemble the speed reducing gear mechanism 16 with the module unit including the electric motor MG and the dual clutch 14. This spline-fitting of the first input shaft 36 and the second input shaft 38 permits assembling of the module unit with the speed reducing gear mechanism 16.

The present embodiment described above is configured such that the oil delivered from the oil pump 35 is supplied to the dual clutch 14 and the electric motor MG accommodated in the first chamber 21. Accordingly, it is possible to prevent the shortage of supply of the oil to the dual clutch 14 and the electric motor MG. On the other hand, the speed reducing gear mechanism 16 accommodated in the second chamber 23 and lubricated by the oil does not require a large amount of the oil, and is therefore lubricated by another independent splash-type oil supply mechanism. Thus, the first chamber 21 is supplied with the pressurized oil delivered from the oil pump 35, while the second chamber 23 is supplied with the oil by the oil supply mechanism not using the oil pump 35, whereby only the required amounts of the oil are supplied to the first and second chambers 21 and 23, so that the fuel economy can be improved.

The present embodiment is further configured such that the speed reducing gear mechanism 16 is the transmission having the two speed positions, and the dual clutch 14 consists the first clutch C1 and the second clutch C2 so that the speed reducing gear mechanism 16 is shifted between the two speed positions, by switching the operating states of the first clutch C1 and the second clutch C2. Accordingly, the speed reducing gear mechanism 16 can be shifted by simply controlling the first clutch C1 and the second clutch C2, without using shift forks and sleeves for the shifting actions, so that the electric drive system 10 can be made simple in construction.

The present embodiment is also configured such that the oil pump 35 is driven by the electric motor MG, and the first clutch C1 placed in the engaged state upon starting of the vehicle is the frictional coupling device of the normally-engaged type which is placed in the engaged state when the hydraulic pressure is not applied thereto. Accordingly, the vehicle can be rapidly started without the hydraulic pressure application to the first clutch C1 to be placed in the engaged state to start the vehicle although the electric motor MG and the oil pump 35 are not driven upon starting of the vehicle, thus the hydraulic pressure application to the first clutch C1 would be delayed.

Second Embodiment

Another embodiment of this invention will be described. It is noted that the same reference signs as used in the preceding embodiment will be used to identify the same elements in the present embodiment.

In the preceding embodiment, the same kind of oil is used in the first chamber 21 and the second chamber 23. In the present embodiment, different kinds of oil are used in the first and second chambers 21 and 23. In the other aspects, the present embodiment is identical with the preceding embodiment, and will not be described with respect to those aspects. In the present embodiment, an oil of the kind suitable for controlling the dual clutch 14 and cooling the electric motor MG is used in the first chamber 21, while an oil of the kind suitable for lubricating the speed reducing gear mechanism 16 is used in the second chamber. Like the preceding embodiment, the present embodiment using the two different kinds of oil has the advantage that only the required amounts of the oil are supplied to the first and second chambers 21 and 23.

It is also noted that the oil used to lubricate the speed reducing gear mechanism 16 contains a large amount of foreign matters. If this oil was used for the hydraulic control of the dual clutch 14, the foreign matters would enter into the valve body 82 for controlling the dual clutch 14, giving rise to a risk of an operating failure (valve sticking) of the valve body 82 due to entry of the foreign matters into the valve body 82. However, the partition wall 24 and the oil seal 80 are provided also in the present embodiment, to prevent the flows of the oil between the chambers 21 and 23, so that the flows of the oil between the first and second chambers 21 and 23 are restricted to prevent the foreign matters contained in the oil in the second chamber 23, from being transferred into the first chamber 21. Accordingly, the foreign matters contained in the oil in the second chamber 23 are prevented from being transferred into the oil in the first chamber 21, so that the risk of the above-indicated operating failure (valve sticking) is reduced. In this respect, it is noted that the oil in the second chamber 23 is used to lubricate the speed reducing gear mechanism 16 and is therefore comparatively likely to contain the foreign matters. The presence of the foreign matters in the first chamber 21 accommodating the dual clutch 14 and the electric motor MG would cause plugging of the valve body 82 with the foreign matters, and the operating failure (valve sticking) of the valve body 82 provided to control the dual clutch 14.

As described above, the oil accommodated in the second chamber 23 and containing the foreign matters will not be transferred into the first chamber 21, so that the above-described valve sticking is prevented. Further, the oil in the first chamber 21 is used as the working fluid for the dual clutch 14 and the coolant for the electric motor MG, so that the amount of the foreign matters contained in the oil in the first chamber 21 is considerably smaller than that contained in the oil in the second chamber 23. Owing to the comparatively small amount of the foreign matters in the oil in the first chamber 21, a strainer used to remove the foreign matters when the oil is sucked up by the oil pump 35 from the lower portion of the first casing 20 can be simplified or eliminated, so that a sucking resistance of the oil pump 35 can be reduced, and the required output of the oil pump 35 can be reduced.

Further, the operating performance of the electric drive system 10 can be further improved owing to the use of the different kinds of oil in the first chamber 21 and the second chamber 23, that is, the use in the first chamber 21 of the oil of the kind suitable for the hydraulic control of the dual clutch 14 and the cooling of the electric motor MG, and the use in the second chamber 23 of the oil of the kind suitable for lubricating the speed reducing gear mechanism 16.

While the embodiments of this invention have been described in detail by reference to the drawings, it is to be understood that the invention may be otherwise embodied.

In the illustrated embodiments, the speed reducing gear mechanism 16 functions as the transmission having the two speed positions. However, the speed reducing gear mechanism 16 is not limited to the transmission having the two speed positions, and may function as a transmission having three or more speed positions. Where the speed reducing gear mechanism 16 is a transmission having three or more speed positions, however, the transmission need to incorporate shift forks and sleeves for selectively establishing the speed positions, and is accordingly complicated in construction.

Although the oil pump 35 is driven by the electric motor MG in the illustrated embodiments, the oil pump 35 may be driven by an exclusive electric motor disposed outside the casing. In this case, the position of the oil pump 35 can be suitably determined.

In the illustrated embodiments, the first clutch C1 is the coupling device of the normally-engaged type which is placed in the engaged state without a hydraulic pressure being applied thereto. However, the first clutch C1 may be the coupling device of the normally-released type which is placed in the engaged state with a hydraulic pressure being applied thereto.

While the bearing 58 provided in the illustrated embodiments is a sealed ball bearing having a function of an oil seal, the bearing 58 need not have a function of an oil seal, provided a separate oil seal is disposed in a gap between the first input shaft 36 and the second input shaft 38, for restricting the flows of the oil in the axial direction.

It is to be understood that the foregoing description is provided for illustrative purpose only, and that the present invention may be embodied with various other changes and improvements, which may occur to those skilled in the art.

NOMENCLATURE OF REFERENCE SIGNS

10: Vehicular electric drive system
14: Dual clutch (Hydraulically operated clutch)
16: Speed reducing gear mechanism (Gear mechanism; speed reducing device)
19: Drive wheels
21: First chamber
23: Second chamber
24: Partition wall
35: Oil pump
78: Connecting hole
80: Oil seal
C1: First clutch (Frictional coupling device to be engaged upon starting of vehicle)
C2: Second clutch (Frictional coupling device)
MG: Electric motor

The invention claimed is:
1. A vehicular electric drive system comprising:
an electric motor operatively connected to drive wheels so that the drive wheels are driven by said electric motor;
a hydraulically operated clutch configured to place a power transmitting path between said electric motor and said drive wheels in a selected one of a power transmitting state and a power cutoff state;
a gear mechanism disposed between said hydraulically operated clutch and said drive wheels, to reduce a speed of a rotary motion of said electric motor;
a first chamber accommodating said electric motor and said hydraulically operated clutch;
a second chamber accommodating said gear mechanism;
a partition wall disposed so as to isolate said first chamber and said second chamber from each other;
a connecting hole formed on said partition wall through which said hydraulically operated clutch and said gear mechanism are operatively connected to each other;
an oil seal fitted in said connecting hole, to restrict flows of an oil through said connecting hole;
an oil pump provided to deliver the oil required within said first chamber; and
a splash type lubricating mechanism provided to supply the oil to said second chamber,
wherein the hydraulically operated clutch overlaps with the electric motor when viewed from an axial direction of the electric motor and at least one part of the hydraulically operated clutch is disposed radially inwardly of coil ends of the electric motor.

2. The vehicular electric drive system according to claim 1, wherein said gear mechanism is a transmission with two speed positions, and said hydraulically operated clutch is a dual clutch including two frictional coupling devices, and
said transmission is shifted between the two speed positions, by switching operating states of said two frictional coupling devices.

3. The vehicular electric drive system according to claim 2, wherein said oil pump is driven by said electric motor, and one of said two frictional coupling devices which is placed in an engaged state upon starting of a vehicle provided with the vehicular electric drive system is a frictional coupling device of a normally-engaged type which is placed in the engaged state when a hydraulic pressure is not applied thereto.

* * * * *